AUTOMATIC GAS CHROMATOGRAPHIC SAMPLE INJECTION DEVICE

Original Filed June 20, 1969 4 Sheets-Sheet 1

INVENTOR.
EDWIN W. SMITH
ERNEST J. KUBIAK, JR.
BY
Woodhams, Blanchard & Flynn
ATTORNEYS

AUTOMATIC GAS CHROMATOGRAPHIC SAMPLE INJECTION DEVICE

Original Filed June 20, 1969 4 Sheets-Sheet 3

INVENTORS
EDWIN W. SMITH
ERNEST J. KUBIAK, JR.
BY Woodhams, Blanchard & Flynn
ATTORNEYS

AUTOMATIC GAS CHROMATOGRAPHIC SAMPLE INJECTION DEVICE

Original Filed June 20, 1969 4 Sheets-Sheet 3

INVENTORS
EDWIN W. SMITH
ERNEST J. KUBIAK, JR.
BY
Woodhams, Blanchard & Flynn
ATTORNEYS

AUTOMATIC GAS CHROMATOGRAPHIC SAMPLE INJECTION DEVICE

Original Filed June 20, 1969 4 Sheets-Sheet 4

INVENTORS
EDWIN W. SMITH
ERNEST J. KUBIAK, JR.
BY
Woodhams, Blanchard & Flynn
ATTORNEYS United States Patent Office Re. 28,058
Reissued July 2, 1974

28,058

AUTOMATIC GAS CHROMATOGRAPHIC SAMPLE INJECTION DEVICE

Edwin W. Smith, Climax Township, Kalamazoo County, and Ernest J. Kubiak, Kalamazoo, Mich., assignors to The Upjohn Company, Kalamazoo, Mich.

Original No. 3,604,269, dated Sept. 14, 1971, Ser. No. 835,081, June 20, 1969. Application for reissue Dec. 4, 1972, Ser. No. 311,787

Int. Cl. G01n *1/02*

U.S. Cl. 73—422 GC 13 Claims

Matter enclosed in heavy brackets [ ] appears in the original patent but forms no part of this reissue specification; matter printed in italics indicates the additions made by reissue.

ABSTRACT OF THE DISCLOSURE

An apparatus for periodically injecting samples of fluid into a receptacle. The apparatus includes a movable frame which supports a syringe having a passageway adapted to be moved through an opening in the receptacle. The syringe controls the collection of a predetermined fluid sample and it is flushed after each use. The syringe is moved by the apparatus to inject the predetermined sample through the passageway into the receptacle.

BACKGROUND OF THE INVENTION

A need has long existed for an automated device to accurately collect a predetermined amount of sample fluid and then inject same into a sample fluid-analyzing system, such as a gas chromatograph. In the past, such injection has been performed manually or by devices which have not been entirely satisfactory. Tests involving the use of a gas chromatograph may extend over several hours during which it has previously been necessary to provide continuous skilled supervision. Usually, the ambient temperature in the region of these tests is elevated so that the operator is uncomfortably warm during the injection procedure. Moreover, the work performed by the operator is tediously repetitious, even though it must be skillfully performed.

Thus, it is a primary object of this invention to provide a sample fluid injection apparatus which is capable of automatically, accurately and repeatedly collecting predetermined amounts of sample fluid and then injecting said amounts into a sample fluid-analyzing system.

It is a further object of this invention to provide an automatic sample fluid injection device which can be easily operated by persons capable of operating the test system with which it is used, which can be manufactured and maintained inexpensively, and which can be easily adapted to use with existing types of gas chromatographs.

Other objects and purposes of this invention will be apparent to persons acquainted with apparatus of this general type upon reading the following specification and inspecting the accompanying drawings, in which.

Certain terminology will be used in the following description for convenience in reference only and will not be limiting. The words "up," "down," "right" and "left" will have reference to the apparatus of the invention as appearing in FIG. 1. The words "front" and "rear" will refer to the front and rear of the apparatus, respectively, the front of the apparatus being illustrated in FIG. 1. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing an apparatus for collecting and injecting a sample fluid into a system and comprises a vertically movable frame having a syringe mounted thereon and movable therewith. The syringe has a needle which is movable through the entrance to the system. The syringe is flushed and then accurately collects a predetermined amount of sample fluid after which the needle is inserted through the entrance of the system and the predetermined amount of sample fluid is thereafter injected into the system.

DETAILED DESCRIPTION

Figure 1:
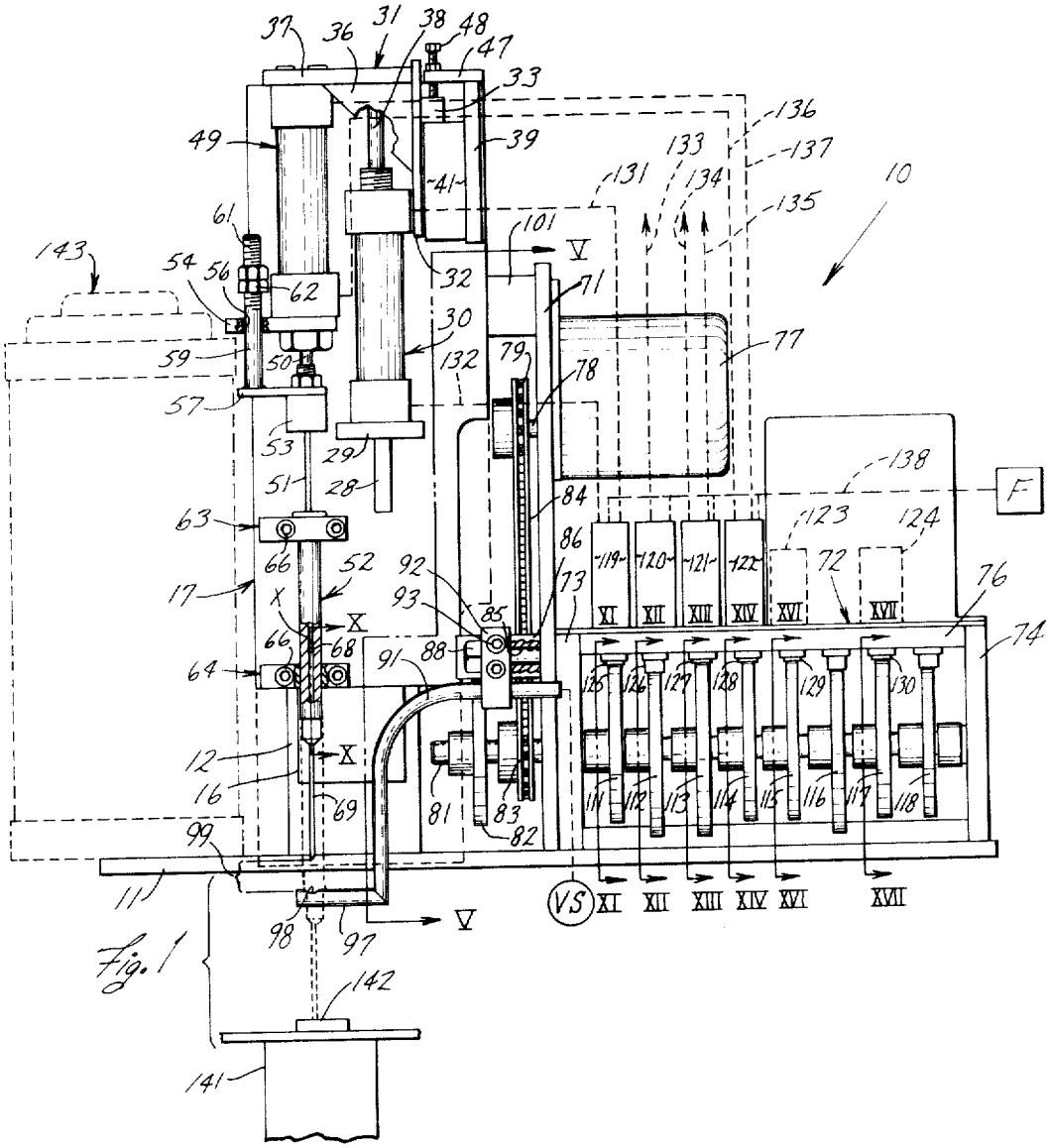
FIG. 1 is a front elevational view, partially broken away, of a fluid sample injecting apparatus embodying the invention and showing the starting position of the power cylinders for controlling the syringe.
Figure 2:
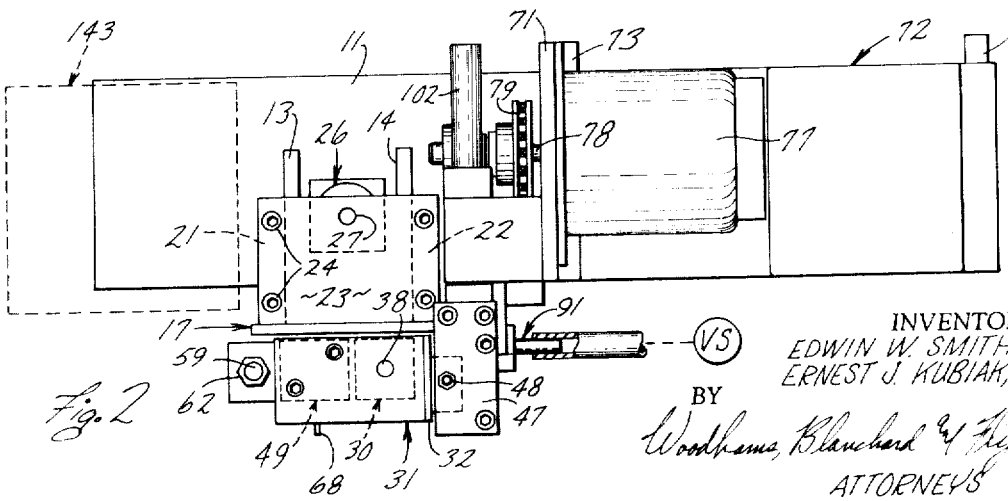
FIG. 2 is a top plan view of the apparatus.

A sample fluid injection apparatus 10 is illustrated in FIG. 1 and comprises a base 11 and a vertical plate 12 (FIG. 3) mounted on the upper surface of the base 11 near the front edge thereof, said plate 12 being braced by a pair of gussets 13 and 14 (FIG. 2). A vertically oriented guide rail 16 (FIGS. 3 and 4) is mounted on the front side of the plate 12 by any convenient means such as screws (not illustrated).

A mounting member 17 has a guide channel 18 (FIGS. 3 and 4) secured thereto and slideably connected to the guide rail 16 by means of the ball bearings 15 which permit vertical movement of the channel relative to the plate 12. A pair of gussets 21 and 22 (FIGS. 2 and 3) are secured to the rear side of the mounting member 17 near its upper end and extend rearwardly therefrom. The upper edges of the gussets 21 and 22 are horizontally aligned and support a plate 23 which is secured thereto by a plurality of countersunk screws 24 (FIG. 2).

A power cylinder 26 (FIGS. 2 and 3), operable by either air or hydraulic fluid, is mounted on the base 11 between the gussets 13 and 14, as shown in FIG. 2. The piston rod 27 of the cylinder 26 is secured to the plate 23 between the supporting gussets 21 and 22 so that operation of the power cylinder 26 causes the rod 27 to move the mounting member 17 vertically relative to the base 11 and plate 12. The control for the power cylinder 26 will be described in more detail hereinafter.

A gusset 28 (FIG. 1) is secured to the front side of the mounting member 17 approximately in the center thereof and supports a plate 29. A power cylinder 30 is mounted on the plate 29 and has a piston rod 38 which extends upwardly therefrom to support the plate 37 of a frame 31 for vertical movement. The frame 31 comprises a plate 32 secured to the plate 37 and having a guide rail 33 secured to one side thereof and provided with bearing ball races 34 (FIG. 4). A gusset 36 (FIGS. 1 and 3) is secured between the plate 37 and one side of the plate 32 to brace the latter. The power cylinder 30 drives the frame 31 vertically relative to the mounting member 17.

A vertical plate 39 is secured to the front surface of the mounting member 17 and projects frontwardly therefrom, as illustrated in FIG. 4. A guide channel 41 (FIG. 4), similar to the guide channel 18, is secured to the plate 39 by any convenient means, such as a plurality of screws (not illustrated). The guide channel 41 has a pair of oppositely facing bearing ball races 43 and 44 which oppose the races 34 and 35, respectively. A plurality of bearing balls 46 are received in the respective races 34, 43 and 35, 44 to guide the vertical movement of the support frame 31 relative to the mounting member 17. An abutment flange 47 (FIG. 1) is secured to the upper edge of the plate 39 and an adjustable screw 48 projects through the abutment flange 47 to engage the upper surface of the guide rail 33 on the plate 32 to limit the upward movement of the frame 31 relative to the mounting member 17.

A power cylinder 49 (FIG. 1) is secured to the underside of the support plate 37 and extends downwardly therefrom. A plate 54 is secured to the lower end of the power cylinder 49 and has an opening 56 therein. The piston rod 50 of the power cylinder 49 is connected to the plunger 51 of a syringe 52 through a coupling 53. A bracket 57 is secured to the coupling 53 of the power cylinder 49 and extends sidewardly where it supports a vertical rod 59 which projects upwardly through the opening 56 in plate 54. The upper end 61 of the rod 59 is threaded to receive adjustable locknuts 62. Thus, upon an extension of the rod 50 of the power cylinder 49, the locknuts 62 will engage the upper surface of the plate 54 to limit downward movement of the plunger 51 relative to the syringe 52.

The syringe 52 is secured to the mounting member 17 by a pair of spaced clamps 63 and 64. In this particular embodiment, each clamp releasably engages the mounting member 17 to permit removal of the syringe 52, by loosening the screws 66 which secure the clamps 63 and 64 to the mounting member 17.

In this particular embodiment, the syringe 52 has a narrow chamber 67 therethrough (FIG. 10) and a passageway 68 communicating therewith. The passageway is connected to a source of liquid S supplied by a pump P schematically illustrated in FIGS. 3 and 10. A needle 69 is connected to the lower end of the syringe barrel 70 and communicates with the chamber 67. Sample liquid can be introduced into the chamber 67 through the passageway 68 and thence through the needle or cannula 69 in a predetermined manner. The plunger 51 is vertically movable in the chamber to eject a predetermined amount of the sample fluid from the syringe through the needle 69. Alternatively, the liquid can be drawn into the syringe barrel 70 through the needle 69 by applying vacuum to the passageway 68.

A support plate 71 (FIGS. 2 and 5) is secured upon the base 11 transversely thereof and extends upwardly therefrom. A frame 72 is mounted on the base 11 and comprises a pair of vertical side members 73 and 74 and an interconnecting cross member 76 (FIG. 1) secured to the upper ends of the vertical side members 73 and 74.

A drive motor 77 is secured to the right side (FIG. 1) of the support plate 71 and has a shaft 78 extending therethrough and secured to a drive sprocket 79. A shaft 81 is rotatably supported by bearings (not shown) located in the vertical side members 73 and 74 of the frame 72. The left end (FIG. 1) of the shaft 81 projects through the side member 73 and the support plate 71 and has a cam 82 secured upon the left end thereof. A sprocket 83 is secured to the shaft 81 between the cam 82 and the support plate 71. Said sprocket 83 and the sprocket 79 on the shaft 78 have radii rotating in a common plane. An endless chain 84 interconnects the sprockets 79 and 83 so that the shaft 81 is rotated by the drive motor 77.

A spacing block 86 (FIG. 1) is secured to the support member 71 on the left side thereof by any convenient means (not shown). The spacer block 86 projects frontwardly from the front edge of the support member 71 as is illustrated in dotted line in FIG. 5 and has an opening 85 (FIG. 1). A lever 87 is pivotally mounted upon the spacer block 86 by the bolt 88 received in the opening 85. The lever 87 is pivotable between the position illustrated in solid lines and the position illustrated in dotted lines in FIG. 5. A cam follower 89 is rotatably mounted on the rear end (FIG. 5) of the lever 87 and is peripherally engaged with the cam surface of the cam 82 so that rotation of the cam 82 will effect a periodic vertical movement of the cam follower 89, hence the lever 87, about the axis of the bolt 88.

A tubular element 91 is gripped by a clamp member 92 which is secured to the lever 87 by screws 93 (FIG. 1). In this particular embodiment, the tubular element 91 extends sidewardly and downwardly from the lever 87 and has a horizontal end portion 97 disposed below, and in line with, the needle 69 of the syringe 52. An opening 98 is provided in the upper surface of the tubular end portion 97 so that the needle 69 can discharge liquid into the end portion across the gap 99 therebetween. A vacuum source VS is connected to the right end of the tubular element 91, as schematically illustrated in FIG. 1.

A mounting block 101 (FIG. 5) is secured to the support plate 71 by any convenient means, not shown. A spring-biased power cylinder 102 is secured to the mounting block 101 and has a rod 103 extending through an opening 104 in the mounting block 101. A piston 106 is secured in the usual manner to the rod 103 and is slideable internally of the cylinder 102. A spring 107 is positioned between the end of the cylinder 102 and the piston 106 to urge the rod 103 rightwardly (FIG. 5) to the position illustrated in solid lines. A block 108 is secured to the rear side of the mounting member 17 and has a recess 109 in the rear face thereof which is alignable with the front end of the rod 103 for reception of said rod 103 when the mounting member 17 is in the raised condition. The right end of the rod 103 is urged into the recess 109 to prevent downward movement of the mounting plate 17 when there is a failure in the supply of fluid pressure to the power cylinders of the sample fluid injection apparatus.

A plurality of cams 111 through 118 (FIG. 1) are secured upon the shaft 81 and are rotatable therewith. The cams 116 and 118, acting through valves not illustrated, control the performance of compenents of the gas chromatograph and associated devices not illustrated herein. A plurality of valves 119 through 122 and switches 123 and 124 are mounted on the upper surface of the cross member 76 of the frame 72 in line with the cams 111 through 115 and 117, respectively. These valves and switches have roller elements 125 through 130, respectively, which engage the peripheries of the cams 11 through 115 and 117, respectively. Rotation of the shaft 81 and cams 111 through 115 and 117 will cause movement of the roller elements 125 through 130 between the positions illustrated in solid lines and the positions illustrated in dotted lines in FIGS. 11 through 14, 16 and 17. The degree of arc shown on or adjacent each of the cams 82 and 111 through 115 and 117 represent the angular distances from the starting position of a cycle of operation through which the cams must rotate to reach a rise or fall in the cam surfaces which will effect a movement of the roller elements 89 and 125 through 130. These angles are shown for illustrative purposes only and are not to be taken as limiting.

Figure 5:
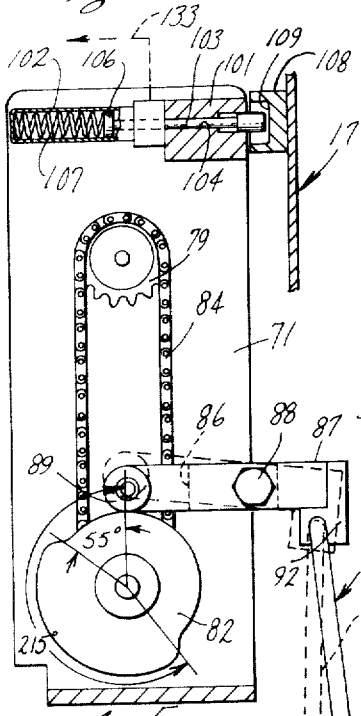
FIG. 5 is a sectional view taken along the line V—V of FIG. 1 and excluding cylinder 26.

The valve 119 (FIG. 1) is connected by a pair of lines 131 and 132 (schematically illustrated by dotted lines) to the power cylinder 30 to supply or return pressure fluid for driving same. The valve 120 is connected through a line 133 (schematically illustrated by dotted lines) to the safety cylinder 102 (FIGS. 2 and 5). The valve 121 is connected through lines 134 and 135 (schematically illustrated by dotted lines) to the power cylinder 25 (FIG. 2) for supplying or returning pressure fluid. The valve 122 is connected through lines 136 and 137 (schematically illustrated by dotted lines) to opposite ends of the power cylinder 49 to supply or return pressure fluid. The valves 119, 120, 121 and 122 are all connected to a source F of pressure fluid by the line 138.

A normally open switch 123 is connected to conventional means (not shown) to effect a braking of the drive motor 77 whenever the switch is changed from the open to the closed condition. A normally open switch 124 is electrically connected to a motor driving the pump P for controlling the supply of fluid to the chamber 67 from the source of liquid S.

In this particular embodiment, the apparatus 10 (FIG. 1) has been designed for use with a gas chromatograph having a vertical column 141 (FIG. 1) with an upwardly facing septum 142 in the upper end thereof through which the cannula 69 is received.

If desired, a timing mechanism 143 (FIGS. 1 and 2) may be connected into the circuit of the motor 77 for controlling the time between cycles of the apparatus during which time the motor 77 remains in the "off" condition so that the chromatograph will be given the proper time to complete its analysis of the sample fluid injected into the column 141 thereof.

Figure 18:
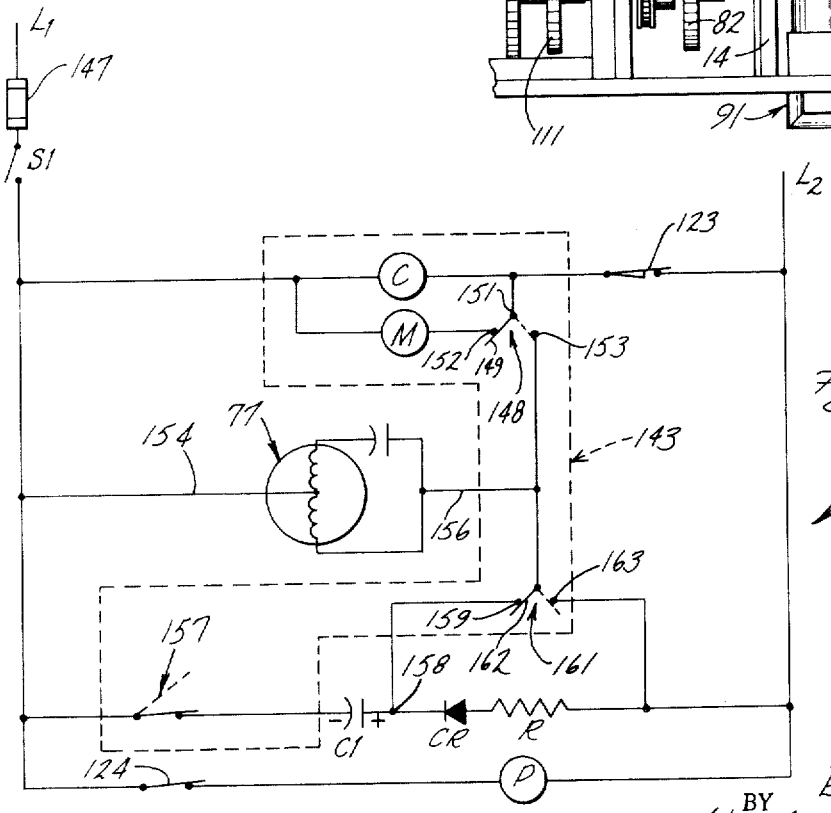
FIG. 18 is a schematic of an electrical circuit utilized in controlling the operation of the drive motor.

The electrical circuit 146 for the apparatus 10 is illustrated in FIG. 18. Electrical power is supplied to the electrical circuit 146 from lines L1 and L2, which circuit is protected by a fuse 147 connected in series with line L1. The circuit 146 is controlled by the switch S1.

The components of the timer 143 are enclosed in broken lines and are positioned for a timing sequence. More particularly, the clutch solenoid C of the timer 143 is connected in series with the normally open switch 123, shown closed by the cam follower 129 (FIG. 16), between the lines L1 and L2. A delayed contact switch 148 has an armature 149 movably connected to the terminal 151, which is connected between the clutch solenoid C and the switch 123. The armature 149 is positioned, in FIG. 18, to connect the terminal 151 to the terminal 152. Thus, the clock motor M is connected in parallel with the clutch solenoid C.

One side of the drive motor 77 is connected by line 154 to the line L1. The other side of the drive motor 77 is conventionally connected through a conductor 156 to the terminal 153 of the delayed contact switch 148. A delayed contact switch 157 is connected in series with a capacitor C1, rectifier CR and load resistor R between the lines L1 and L2. In the position shown, the delayed contact switch 157 is in the closed position. A junction point 158, located between the capacitor C1 and the relay CR, is connected to terminal 159 of an instantaneous contact switch 161. The armature 162 of the switch 161 is connected through a conductor to the terminal 153 of the delayed contact switch 148. In the condition illustrated for the timer 143, the junction point 158 is connected through the armature 162 to the conductor 156 of the drive motor 77 and the terminal 153. A terminal 163 of the instantaneous contact switch 161 is connected to line L2.

The normally open switch 124, shown closed by the cam follower 130 (FIG. 17), is connected in series with the pump motor P for driving the pump to supply fluid to the cylinder barrel 70 and chamber 67 therein. While 143 is in the timing sequence, the switch 124 is closed so that the drive motor for the pump P is energized to supply a quantity of fluid to the chamber 67.

OPERATION

Although the operation of the above-described apparatus will be apparent to skilled persons from reading the foregoing description and examining the accompanying drawings, such operation will now be briefly summarized. The column 141 (FIG. 1) is part of the conventional gas chromatograph having a rubber septum 142 which is penetrated by the needle 69 of the syringe 52.

The rod 103 (FIG. 5) of the cylinder 102 will initially extend into the pocket 109 before fluid pressure is supplied to the valve 119 through 122 and to the cylinders 26, 30, 49 and 102. That is, the spring 107 will urge the piston 106 and rod 103 rightwardly to lock the mounting member 17 in the raised position.

Figure 3:
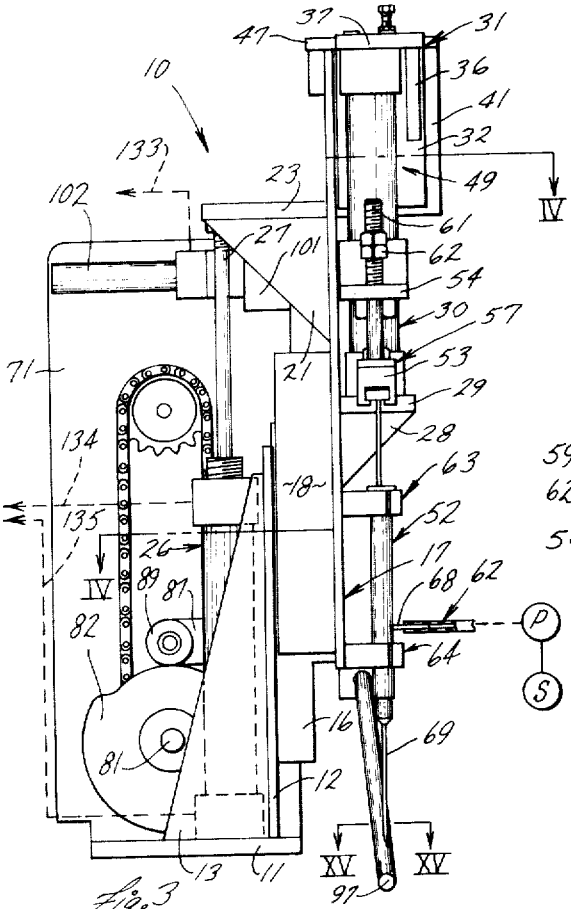
FIG. 3 is a side elevational view as seen from the left side of the apparatus illustrated in FIG. 1.
Figure 4:
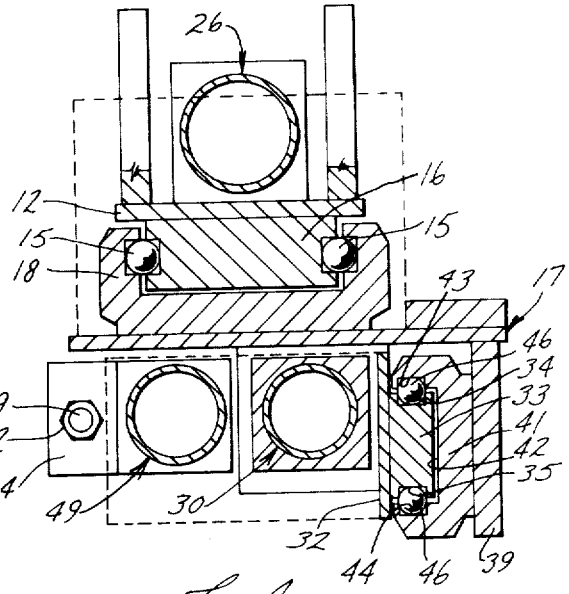
FIG. 4 is a sectional view taken along the line IV—IV of FIG. 3.

When operating pressure is initially supplied to the system, the valves 119, 121 and 122 will direct pressure fluid to the power cylinders 26, 30 and 49, respectively, whereby their rods 27, 38 and 50, respectively, will assume the positions illustrated in FIGS. 1 and 3. That is, the power cylinder 26 is energized to maintain the rod 27 (FIG. 3) fully extended so that the mounting member 17 is maintained in an elevated position to space the needle 69 of the syringe 52 above the septum 142 of the chromatograph column 141. At this point, however, no pressure is yet applied to the cylinder 102 from source F, so that the spring 107 is holding the rod 103 of the cylinder 102 in an extended position to lock the mounting member 117 in its raised position.

Figure 10:
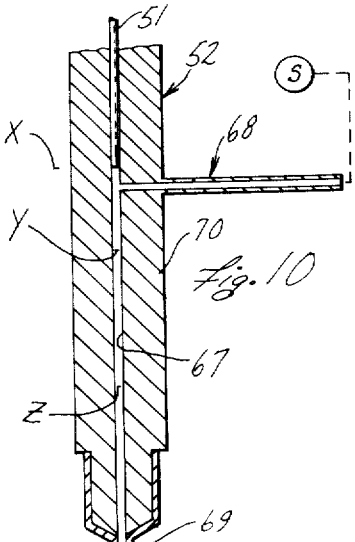
FIG. 10 is a sectional view taken along the line X—X of FIG. 1.

With fluid pressure applied to the system, the rod 38 of the power cylinder 30 is in the extended position whereby the support plate 37 and the power cylinder 49 are held in a raised position relative to the mounting member 17. The rod 50 of the power cylinder 49 is in the retracted position so that the lower end of the plunger 51 is in its highest position "X" (FIG. 10). Thus, the plunger 51 permits communication between the passageway 68 and the chamber 67.

Figure 16:
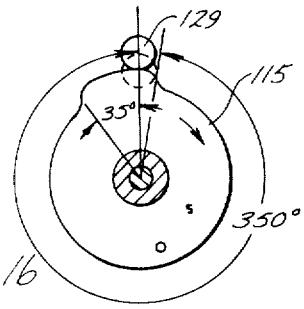
FIG. 16 is a sectional view taken along the line XVI—XVI of FIG. 1.
Figure 17:
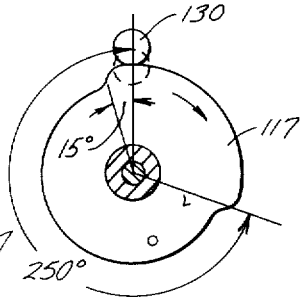
FIG. 17 is a sectional view taken along the line XVII—XVII of FIG. 1.
Figure 6:
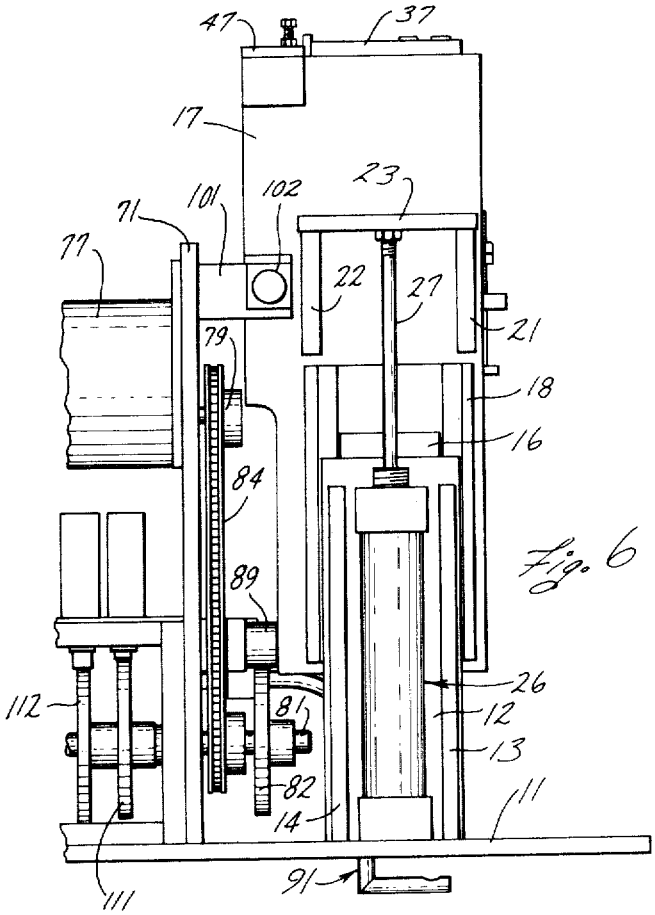
FIG. 6 is a fragmentary, rear elevational view of the apparatus.

The drive motor 77 is initially deenergized. However, when the timer 143 reaches a predetermined time in the operating cycle, the armatures of switches 148 and 157 will be moved by the timer to the dotted line positions to deenergize the clock motor M. Movement of the armature 149 from the terminal 152 to the terminal 153 in the switch 148 will cause the drive motor 77 to become energized through the closed switch 123, which switch is maintained in the closed position by the roller element 129 (FIG. 16). Energization of the motor 77 (FIG. 1) will effect a rotation of the sprocket 79 and endless chain 84 to rotate the sprocket 83 and the shaft 81, as well as the cams 82 and 111 through 118. Since the switch 123 remains in the closed position for a short period of time, power is still applied to the clutch solenoid C in the timer 143 thereby preventing the timer from resetting.

Figure 7:
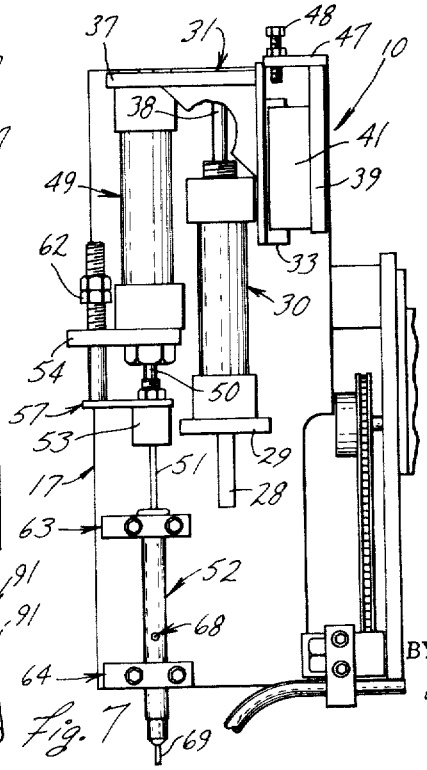
FIG. 7 is a fragment of FIG. 1 showing a second position of the power cylinders for controlling the syringe.

During this stage of the operation, the pump P is in the "on" condition and is maintained in the on condition by the roller 130 (FIG. 17) engaging the high lobe on the cam 117. After 10 degrees of rotation of the shaft 81 (FIG. 11) in a clockwise direction, the cam 111 will permit the cam follower 125 to move to the broken line position and shift the valve 119 and operate the power cylinder 30 to retract the rod 38 from the position illustrated in FIG. 1 to the lowered position illustrated in FIG. 7. This will move the plunger 51 of the syringe 52 to the intermediate position "Y" (FIG. 10) whereby the inlet passageway 68 is blocked from communication with chamber 67.

Continued rotation of cam 117 for another 5° (or a total of 15°) causes the cam 117 (FIG. 17) to permit a lowering of the cam follower 130 to the broken line position to open the switch 124 which deenergize the pump motor P. Although the liquid is restricted from flowing into the chamber 67 while the pump P is still operating, the pump is shut off before there is any sufficient pressure developed to rupture the line. The delay in shutting off the pump also prevents air bubbles from developing in the liquid.

Continued rotation of the shaft 81 through 20° (a total of 35°) will cause the cam 115 (FIG. 16) to lower the cam follower 129 to the broken line position (FIG. 16) to effect an opening of the switch 123 (FIG. 18). The opening of the switch 123 effectively deenergizes the clutch solenoid to reset the timer 143. Simultaneously therewith, the resetting of the timer 143 causes the switches 148 and 157 to return to their solid line positions illustrated in FIG. 18 and the armature 162 of the switch 161 to move to the dotted line position. Thus, power is still applied to the drive motor 77 through the terminal 163, armature 162 and line 156 to maintain a continued rotation of the shaft 81. The closing of the switch 157 completes the circuit so that current will flow through the rectifier CR to charge the capacitor C1. The purpose of this will become apparent hereinbelow.

Figure 15:
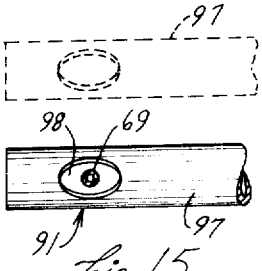
FIG. 15 is a sectional view taken along the line XV—XV of FIG. 3.
Figure 11:
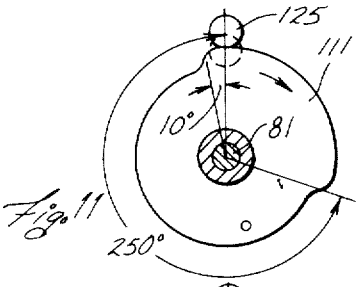
FIG. 11 is a sectional view taken along the line XI—XI of FIG. 1.
Figure 12:
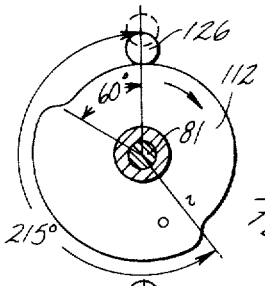
FIG. 12 is a sectional view taken along the line XII—XII of FIG. 1.
Figure 13:
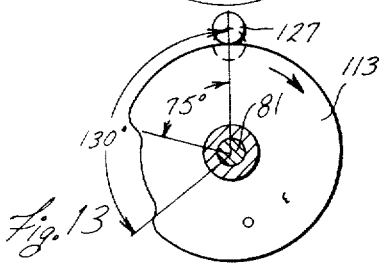
FIG. 13 is a sectional view taken along the line XIII—XIII of FIG. 1.
Figure 14:
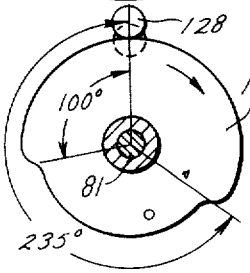
FIG. 14 is a sectional view taken along the line XIV—XIV of FIG. 1.

Further rotation of the shaft 81 through 20° (a total of 55°) will cause the cam 82 (FIG. 5) to raise the cam follower 89 to the broken line position and thereby displace the tubular end portion 97 (FIG. 15) from beneath the needle 69 of the syringe 52. The shaft 81 then rotates another 5° (a total of 60°) and thereby causes the cam 112 (FIG. 12) to move the cam follower 126 to the broken line position to shift the valve 120 to supply pressure fluid to the cylinder 102 to urge the piston 106 leftwardly against the force of the spring 107 to retract the rod 103 from the pocket 109 and thereby unlock the mounting member 17.

Figure 8:
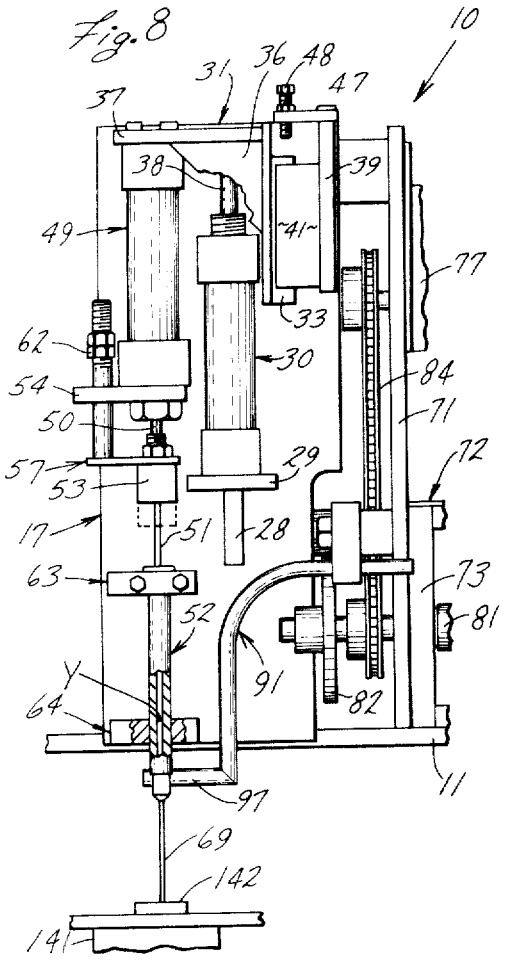
FIG. 8 is a fragment of FIG. 1 showing a third position of the power cylinders controlling the syringe.

Continued rotation of the shaft 81 through 15° (a total of 75°) will cause the cam 113 (FIG. 13) to permit lowering of the cam follower 127 to the broken line position to shift the valve 121 to operate the power cylinder 26 to retract the rod 27 and lower the mounting member 17, syringe 52 and needle 69 into their positions illustrated in FIG. 8, wherein the needle 69 penetrates the rubber septum 142 of the column 141.

Figure 9:
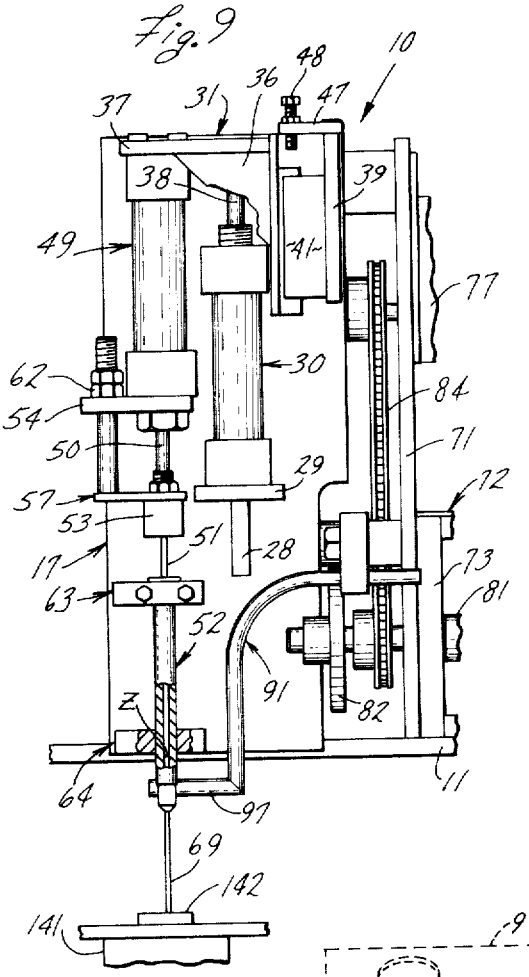
FIG. 9 is a fragment of FIG. 1 showing a fourth position of the power cylinders controlling the syringe.

Further rotation of the shaft 81 through 25° (to the 100° position) will cause the cam 114 (FIG. 14) to effect a lowering of the cam follower 128 to the broken line position wherein the value 122 will be shifted to energize the power cylinder 49 and extend the rod 50 to the position illustrated in FIG. 9. This will move the plunger 51 from the position "Y" (FIG. 10) to the position "Z" whereby a measured quantity of sample liquid contained within the syringe will be injected into the column 141 of the chromatograph.

Additional rotation of the shaft 81 through 30° (to the 130° position) will effect a movement of the cam follower 127 (FIG. 13) back to the solid line position to shift the valve 121 and energize the power cylinder 26 to extend the rod 27 to the position illustrated in FIGS. 1 and 3. This will raise the mounting member 17, syringe 52 and needle 69 to disengage the needle 69 from the rubber septum 142.

A continued rotation of the shaft 81 through 85° (a total of 215°) will cause the cam 82 to move the follower 89 (FIG. 5) back to the solid line position and thereby place the tubular end portion 97 (FIG. 15) beneath the needle 69 of the syringe 52. Simultaneously therewith, the cam follower 126 (FIG. 12) will move back to the solid line position to cause the valve 120 to cut off the supply of pressure fluid to the cylinder 102 whereby the spring 107 urges the end of the rod 103 into the pocket 109 to lock the mounting member 17 against vertical movement.

Continued rotation of the shaft 81 through 20° (a total of 235°) will cause the cam 114 (FIG. 14) to raise the cam follower 128 to the solid line position thus operating the valve 122 and thereby activating the power cylinder 49 which moves the rod 50 to the position illustrated in FIG. 1 and thereby rotates the plunger 51 to the position "Y" of FIG. 10.

Further rotation of the shaft 81 through 15 degrees (a total of 250°) will cause the cam 111 (FIG. 11) to raise the cam follower 125 to the solid line position to shift the value 119 and operate the power cylinder 30 to extend the rod 38 to the FIG. 1 position. This will move the plunger 51 of the syringe 52 to its highest position "X" illustrated in FIG. 10 whereby the inlet passageway 68 again communicates with the chamber 67. Simultaneously therewith, the cam follower 130 (FIG. 17) will move back to the solid line position to close the switch 124 (FIG. 18) to energize the pump motor P to move liquid through the inlet passageway 68, the chamber 67 and the needle 69. The discharge liquid will be directed into the opening 98 in the portion 97 of the tubular element 91 and exhausted therefrom by the vacuum VS.

Continued rotation of the shaft 81 through 100° (a total of 350°) will cause the follower 129 (FIG. 16) to move back to the solid line position to close the switch 123 (FIG. 18) to start the timer 143. Simultaneously with the starting of the timer 143, the armature 162 of the switch 161 will be moved by the timer to terminal 159 so that power is discontinued to the drive motor 77 and the capacitor C1 is discharged into the drive motor 77 to dynamically brake same in a well-known manner.

The gas chromatograph will continue to perform its analyzing function on the sample liquid injected therein in a conventional manner. This analyzing process and the operation of the apparatus 10 can vary in time depending upon the type and quantity of sample liquid injected into the column, as well as the type of tests that are being conducted on the sample liquid. The timing mechanism 143 can be adjusted accordingly to provide ample time to permit a complete test to be conducted on the sample liquid injected into the column. At the completion of the predetermined test time set into the timer 143, the above-described operation can be repeated on a new sample liquid-sequentially.

The foregoing description and operation have been directed to an apparatus 10 designed for use with an upright column 141 having a septum 142 at the upper end. Thus, it is at least advantageous to provide an apparatus for moving the syringe vertically. However, some chromatographs have sidewardly opening septums. In such case, the apparatus 10 can be positioned on its side and, with minor modifications, adapted to move the needle 69 sidewardly.

The apparatus 10 can be adapted to obtain liquid samples, intermittently, from a plurality of containers presented sequentially and periodically to a position below the needle 69. In such case, the needle 69 would, at least intermittently, be connected by the passageway 68 to a source of reduced pressure so as to withdraw a sample from a container presented to it. Thereafter, the sample would be discharged into the column 141, as discussed above. In order to clean the syringe between samples, the syringe would be connected by the passageway 68, acting through valve means (not shown), to a pressurized source of cleaning liquid which would be discharged through the needle and into the end portion 97 of the tube 91, as described above.

It may be advantageous to use a vacuum system to both purge the syringe with a cleaning solution and thereafter draw a sample liquid into the syringe because the quantity of sample required will be only enough to fill the chamber 67 and needle 69. However, in the case of the pressure system the amount of sample required is several times the volume of the chamber 67 in order to effectively purge the previous sample from the chamber and needle.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. An apparatus for injecting a sample of liquid into an opening in a receptacle, comprising:

base means;

a mounting member supported by said base means for reciprocable movement relative to said base means;

first actuating means connected to said base means for effecting said movement of said mounting member;

syringe means supported on said mounting member and having outlet means arranged for insertion into said opening in said receptacle, said syringe means having a chamber and a plunger slideably disposed in said chamber for discharging liquid from said chamber through said outlet means;

a source of liquid;

means adapted to provide a driving force for said liquid;

conduit means communicating between said chamber and said driving force means;

second actuating means supported by said mounting member and connected to said plunger for moving same relative to said syringe means, including a position blocking said communication; and control means for effecting operation of said first and second actuating means to permit said liquid to move through said outlet means and said chamber for a selected period of time after which said plunger blocks said communication to limit the liquid in said chamber to a selected amount and said syringe means is thereafter caused to inject said selected amount of said liquid into said receptacle.

2. An apparatus for injecting a sample of liquid into an opening in a receptacle, comprising:

base means;

a mounting member supported by said base means for reciprocable movement relative to said base means;

first actuating means connected to said base means for effecting said movement of said mounting member;

syringe means supported on said mounting member and having outlet means arranged for insertion into said opening in said receptacle, said syringe means having a chamber and a plunger slideably disposed in said chamber for discharging liquid from said chamber through said outlet means;

a source of liquid under pressure;

conduit means communicating between said source and said chamber;

second actuating means supported by said mounting member and connected to said syringe means for effecting relative movement between said outlet means and said plunger; and control means for effecting operation of said first and second actuating means to permit said liquid to discharge through said outlet means for a selected period of time after which said syringe means is caused to inject a selected amount of a liquid into said receptacle.

3. An apparatus according to claim 2, including exhaust means supported on said base means and having inlet means near said outlet means, said exhaust means being moved intermittently by said control means into and out of a position aligned with the discharge end of said outlet means to collect said liquid discharging from said outlet means during said selected period of time.

4. An apparatus according to claim 3, wherein said second actuating means comprises:

support means slideably mounted upon said mounting member for movement in a direction parallel with the movement of said mounting member;

a first pressure fluid-operated cylinder connected between said mounting member and said support means for effecting said movement of said support means; and a second pressure fluid-operated cylinder connected between said support means and said plunger, whereby said first cylinder urges said plunger into a position blocking said conduit means and said second cylinder causes said plunger to discharge said selected amount of liquid.

5. Apparatus for injecting a sample liquid into an upwardly facing opening of a gas chromatograph, comprising:

base means;

a mounting member supported by said base means for vertical movement relative to said base means;

first actuating means connected between said base means and said mounting member for effecting said vertical movement of said mounting member;

a syringe secured to said mounting member and having outlet means vertically aligned with said opening in said chromatograph, said syringe having a chamber and a plunger slideably disposed in said chamber for discharging liquid from said chamber through said outlet means;

a source of liquid under pressure;

conduit means communicating between said source and said chamber;

second actuating means supported by said mounting member and connected to said plunger for moving said plunger vertically relative to said syringe;

exhaust means having inlet means supported on said base means for movement into and out of a position between said opening in said chromatograph and said outlet means; and control means for effecting operation of said first and second actuating means to permit said liquid to discharge through said outlet means into said inlet means for a selected period of time after which said syringe is caused to inject a selected amount of said liquid into said chromatograph.

6. An apparatus according to claim 5, wherein said first actuating means is a first pressure fluid-operated cylinder having a piston connected to said mounting member;

wherein said second actuating means comprises a second pressure fluid-operated cylinder secured to said mounting member and having an upright piston connected to a frame and adapted to move said frame relative to said mounting member, and a third pressure fluid-operated cylinder carried by said frame and having a downwardly extending piston connected to said plunger.

7. An apparatus according to claim 6, wherein said outlet means of said syringe is a needle;

wherein said first pressure cylinder moves said needle from a position above said inlet means through said opening in said chromatograph;

wherein said second pressure cylinder moves said plunger into a position blocking said conduit means; and wherein said third pressure cylinder causes said plunger to discharge said selected amount of liquid into said chromatograph.

8. An apparatus according to claim 5, wherein said exhaust means includes a source of reduced pressure and first tubular means communicating betwen said inlet means and said source of reduced pressure; and said inlet means comprises a second, rigid tubular means supported upon said base means and having an end portion with an inlet opening therein aligned with said outlet means when said end portion is in said position between said outlet means and said opening in said chromatograph.

9. An apparatus according to claim 5, wherein said actuating means comprise fluid-operated cylinders and a source of fluid connected to said cylinders;

wherein said control means comprises a plurality of cam-actuated valves connected between said cylinders and said source of fluid, and a plurality of cams mounted upon shaft means supported by said base means, said cams being operably connected with said valve means for controlling the flow of fluid to said cylinders; and drive means for rotating said shaft means.

10. An apparatus for injecting a sample of fluid into an opening in a receptacle, comprising:

syringe means having outlet means and means supporting same for alignment with an insertion into said opening in said receptacle, said syringe means having a chamber and a plunger slideably disposed in said chamber for discharging liquid from said chamber through said outlet means;

a source of liquid;

means adapted to provide a driving force for said liquid;

conduit means communicating between said chamber and said driving force means;

actuating means drivingly interconnected to said plunger for moving same between a plurality of positions, including a position blocking the communication between said conduit means and said chamber; and control means for effecting operation of said actuating means (1) to permit said liquid to move through said outlet means and said chamber for a selected period of time, (2) to thereafter move said plunger to block said communication to limit the liquid in said chamber to a selected amount, and (3) to thereafter cause said syringe means to inject said selected amount of said liquid into said receptacle.

11. An apparatus according to claim 10, wherein said actuating means includes:

first drive means connected to said plunger for causing linear movement thereof in a first direction;

second drive means connected in series with said first drive means for causing linear movement thereof in a second direction parallel to said first direction; and third drive means connected to said supporting means for causing linear movement of said supporting means and said syringe means in a third direction parallel to said first direction.

*12. An apparatus for injecting a sample of liquid into an opening in a receptable, comprising:*

*base means;*

*a mounting member supported by said base means for reciprocable movement relative to said base means;*

*first actuating means connected to said base means for effecting said movement of said mounting member;*

*syringe means supported on said mounting member and having outlet means arranged for insertion into said opening in said receptacle, said syringe means having a chamber and a plunger slideably disposed in said chamber for discharging liquid from said chamber through said outlet means;*

*a source of liquid;*

*means adapted to provide a driving force for said liquid;*

*conduit means communicating between said chamber and said driving force means;*

*second actuating means supported by said mounting member and connected to said plunger for moving same relative to said syringe means, including a position blocking said communications; and*

*control means for effecting operation of said first and second actuating means to permit said liquid to move through said outlet means and said chamber after which said plunger blocks said communication to limit the liquid in said chamber to a selected amount and said syringe means is thereafter caused to inject said selected amount of said liquid into said receptacle.*

*13. An apparatus for injecting a sample of fluid into an opening in a receptacle, comprising:*

*syringe means having outlet means and means supporting same for alignment with and insertion into said opening in said receptacle, said syringe means having a chamber and a plunger slideably disposed in said chamber for discharging liquid from said chamber through said outlet means;*

*a source of liquid;*

*means adapted to provide a driving force for said liquid;*

*conduit means communicating between said chamber and said driving force means;*

*actuating means drivingly interconnected to said plunger for moving same between a plurality of positions, including a position blocking the communication between said conduit means and said chamber; and*

*control means for effecting operation of said actuating means (1) to permit said liquid to move through said outlet means and said chamber, (2) to thereafter move said plunger to block said communication to limit the liquid in said chamber to a selected amount, and (3) to thereafter cause said syringe means to inject said selected amount of said liquid into said receptacle.*

References Cited

The following references, cited by the Examiner, are of record in the patented file of this patent or the original patent.

UNITED STATES PATENTS

| | | | |
|---|---|---|---|
| 2,672,271 | 3/1954 | Gorham | 141—130 |
| 3,188,181 | 6/1965 | Peterson et al. | 73—425.4 |
| 3,508,442 | 4/1970 | Lichtner et al. | 73—423 |

S. CLEMENT SWISHER, Primary Examiner

U.S. Cl. X.R.

73—423 A